United States Patent [19]
Ghaffari et al.

[11] Patent Number: 5,931,920
[45] Date of Patent: Aug. 3, 1999

[54] COMMAND INTERPRETER SYSTEM IN AN I/O CONTROLLER

[75] Inventors: Bahareh Ghaffari, Denver; Kenneth J. Gibson, Boulder, both of Colo.

[73] Assignee: Adaptec, Inc., Milpitas, Calif.

[21] Appl. No.: 08/906,369

[22] Filed: Aug. 5, 1997

[51] Int. Cl.$^6$ .................................................. G06F 13/00
[52] U.S. Cl. .................................................. 710/5; 710/22
[58] Field of Search .................. 710/5–6, 20–24; 398/306; 711/116–118

[56] References Cited

U.S. PATENT DOCUMENTS

| | | | |
|---|---|---|---|
| 4,797,812 | 1/1989 | Kihara | 395/846 |
| 5,239,640 | 8/1993 | Froemke et al. | 395/425 |
| 5,491,814 | 2/1996 | Yee et al. | 395/556 |
| 5,497,476 | 3/1996 | Oldfield et al. | 711/112 |
| 5,748,806 | 5/1998 | Gates | 395/306 |
| 5,761,861 | 6/1998 | Brackett | 52/218 |
| 5,784,390 | 7/1998 | Masiewicz et al. | 371/40.11 |
| 5,840,038 | 11/1998 | Williams et al. | 710/5 |

*Primary Examiner*—Christopher B. Shin
*Attorney, Agent, or Firm*—Duft, Graziano & Forest, P.C.

[57] ABSTRACT

A hardware accelerated I/O data processing engine to execute a minimum number of types of I/O data processing commands in response to a stimulus from a host computer. The data processing engine, referred to as a command interpreter includes a command queue, a logic unit, a multiple purpose interface, at least one memory, and a controlling state machine, that each operate in concert with each other and without software control. The types of commands executed by the command interpreter can include, but are not limited to, an Initialize, Copy, DMA Read, DMA Write, Cumulative Exclusive OR, Verify, Compare, and ECC Check. The execution of commands that specify a source data location and a destination data location are characterized by a plurality of reads to an internal cache from the source data location for each bulk write from the internal cache to the destination data location. The locations of the data operated on by the command interpreter include a local I/O controller memory and a non-local I/O controller memory accessible to the command interpreter by way of an I/O bus.

19 Claims, 13 Drawing Sheets

COMMAND INTERPRETER SYSTEM IN AN I/O CONTROLLER

SUMMARY OF THE INVENTION

The present invention relates to a data processing engine in an I/O controller, and more particularly to a hardware accelerated command interpreter that fetches and executes low level I/O specific commands on behalf of at least one higher level host or device.

PROBLEM

An Input/Output (I/O) controller is a system that manages the detailed operations required to move data from a source location to a destination location at the request of a local or remote computing device. A local computing device can include, but is not limited to, an internal host processor that controls an I/O bus that is used by the I/O controller. A remote computing device can include, but is not limited to, an external host processor that has access to a local computing device and/or an I/O bus that is used by the I/O controller. A source location and a destination location of data being moved by the I/O controller can both exist on the same I/O bus or on at least two separate I/O busses, and can be any combination of computing entity including, but not limited to, a local or remote computing device and local or remote data storage device.

One persistent problem with existing I/O controllers is that moving data to and from data storage devices by way of I/O busses is a relatively slow process compared to the processing speeds of even an average processor or Central Processing Unit (CPU) that manipulates the data. For this reason, there is an ongoing need for faster and more efficient techniques of moving data between computing devices and/or data storage devices.

One solution to faster and more efficient I/O controllers is to process I/O requests by borrowing processing cycles from an internal host multipurpose processor that is local to an I/O bus over which data is moved. However, this is an inefficient use of a multipurpose processor that is not dedicated to performing the processor intensive data move operations. Further, the software that controls the data move operations is too slow and is subject to interruption by other processes that demand processor time before a given I/O operation is complete. For these reasons, borrowing processing time from a multi-purpose processor is undesirable. Although using a faster and more powerful processor is one solution to serving the increased I/O request demands on an internal host processor, such a solution is undesirable because it unnecessarily increases the cost of the product that embodies the more powerful processor.

Another solution to faster and more efficient I/O controllers is for the internal host processor that is local to the I/O bus to delegate specific I/O operations to an independent sequencer in a Very Large Scale Integrated circuit (VLSI) chip. However, existing independent sequencers have restricted or otherwise inefficient designs that limit the amount of data that can be processed at one time, due to a small word size or limited bus bandwidth and speed, or that require too many read/write operations to an external memory to complete a given task. Further, existing sequencers lack a complete complement of logic and/or memory components required to complete an I/O request independently. For these reasons, delegating specific I/O operations to a programmable sequencer that is not fully independent is also undesirable.

Another problem that makes moving data from a source location to a destination location a slow process is that situations exist where it is appropriate for an I/O controller to modify and/or manipulate the data that is being moved. One example of a situation where data is modified and/or manipulated is where the I/O controller is a data storage device controller for a Redundant Array of Independent Disks (RAID) system.

A RAID system is a storage device where two types of data are distributed across a plurality of magnetic disk drives for the express purpose of preventing the loss of data if any one of the plurality of magnetic disk drives should fail. One of the types of data is the user data that is being read or written to the storage device. The other type of data is the parity data that is derived from the user data and stored separately from the user data in the plurality of magnetic disk drives. The parity data is the result of an Exclusive-OR (XOR) operation on the user data and is used to reconstruct the corresponding user data in the event the disk containing the user data fails.

However, implementing the XOR operation as a software process of an internal host processor further reduces the performance of the internal processor to an extent that can interfere with the data transfer itself. Further, delegating the XOR operation to existing sequencers is undesirable for reasons previously stated that include, but are not limited to, the lack of independent functioning of existing sequencers, and the lack of caching or local memory access capabilities. The result if these sequencer deficiencies is the inability to perform cumulative XOR operations and the inefficiency of one write operation for each read operation.

For these reasons there exists a long felt need for a fast and efficient technique for moving data from a source location to a destination location by an I/O controller and/or manipulating the data as it is being moved by an I/O controller. A solution to this problem as disclosed and claimed herein and has heretofore not been known.

SOLUTION

The above identified problems are solved by the improved command interpreter in an I/O controller of the present invention. The improved command interpreter system is an independently functioning, self-contained, hardware accelerated I/O data processing engine that executes a programmable set of I/O data processing commands in response to a stimulus from a host processor. The hardware accelerated I/O data processing engine is comprised of registers and hardware implemented logic blocks that include a command queue, a logic unit, a multi-purpose interface, at least one local memory, and a controlling state machine, that each operate in concert without software control. The types of I/O data processing commands executed by the command interpreter can include, but are not limited to, an Initialize, Copy, DMA Read, DMA Write, Exclusive OR, Verify, Compare, and ECC Check. The locations of the data operated on by the command interpreter include a memory local to the command interpreter and a memory remote from but accessible to the command interpreter by way of an I/O bus. The combination of an independently functioning hardware implemented command interpreter with improved operational logic results in a faster, more efficient command interpreter and I/O subsystem. One additional feature that increases the efficiency of the command interpreter is that an internal buffer allows multiple reads of source data to each single write of destination data because the internal buffer has the capacity to store source and destination data during data manipulations. One use of this internal buffer for multiple reads for each write is in a cumulative XOR operation.

The stimulus that starts the command interpreter I/O data processing activities is the writing of a command block address into a register in the command interpreter. The contents of a command block can include, but is not limited to, a command code that identifies a type of operation to perform, at least one pointer to a list of data locations, and at least one counter representing the number of scatter/gather lists that are pointed to by the command block. The data locations for a data source are in a data structure known as a source scatter/gather list, and the locations for a data destination are in a data structure known as a destination scatter/gather list. Each source or destination scatter/gather list contain pointers to actual data locations that are either in a memory local to the command interpreter or a memory remote from the command interpreter but accessible by way of an interconnecting I/O bus. Each data location entry in a scatter/gather list is accompanied by a byte count of the number of bytes at a given data location. The data location lists are called scatter/gather lists because the data being operated on can be gathered from and scattered to various memory locations across a computing system.

DETAILED DESCRIPTION

Figure 1:
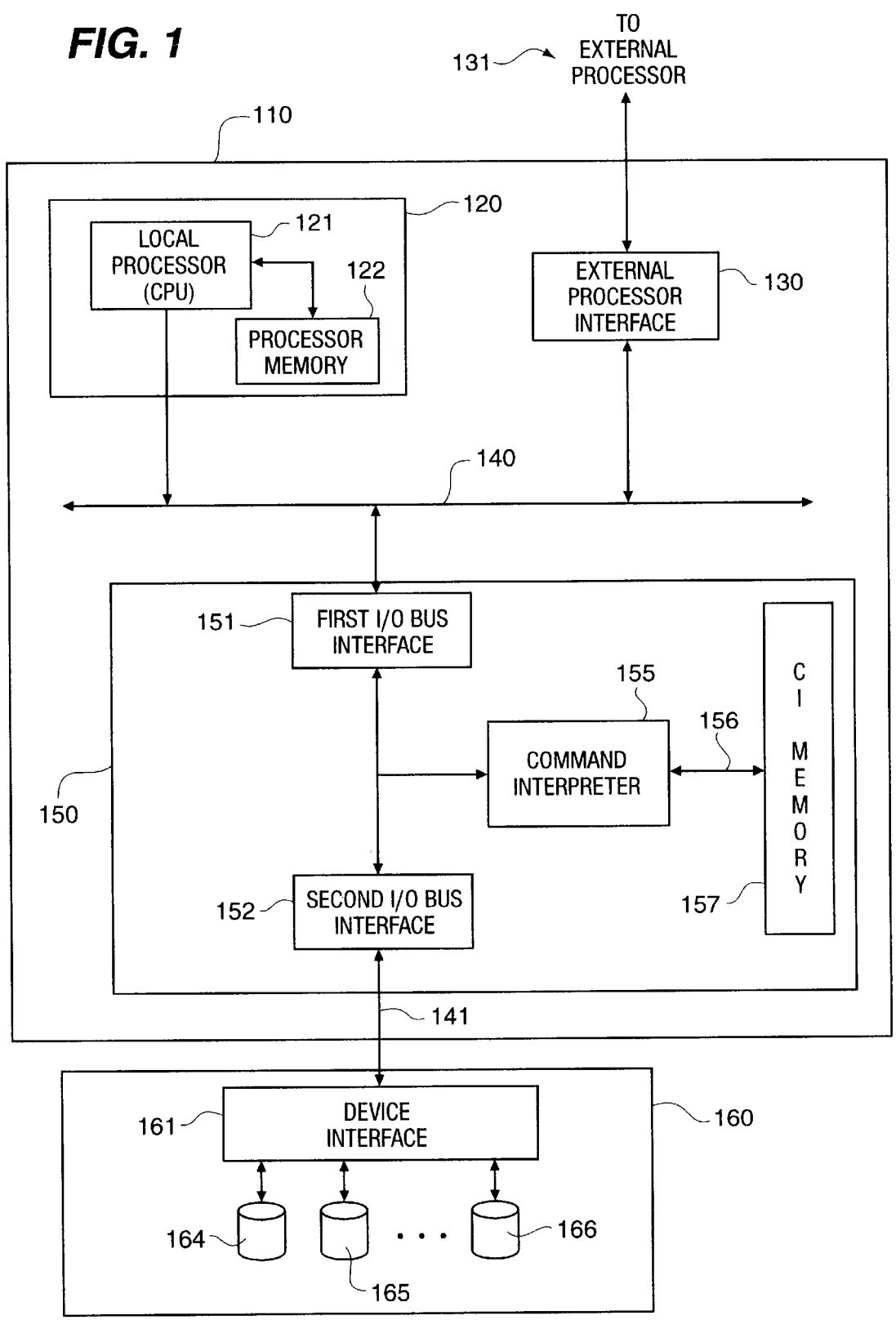
FIG. 1 illustrates a system level block diagram view of a computing system with an I/O controller and Cl.
Figure 2:
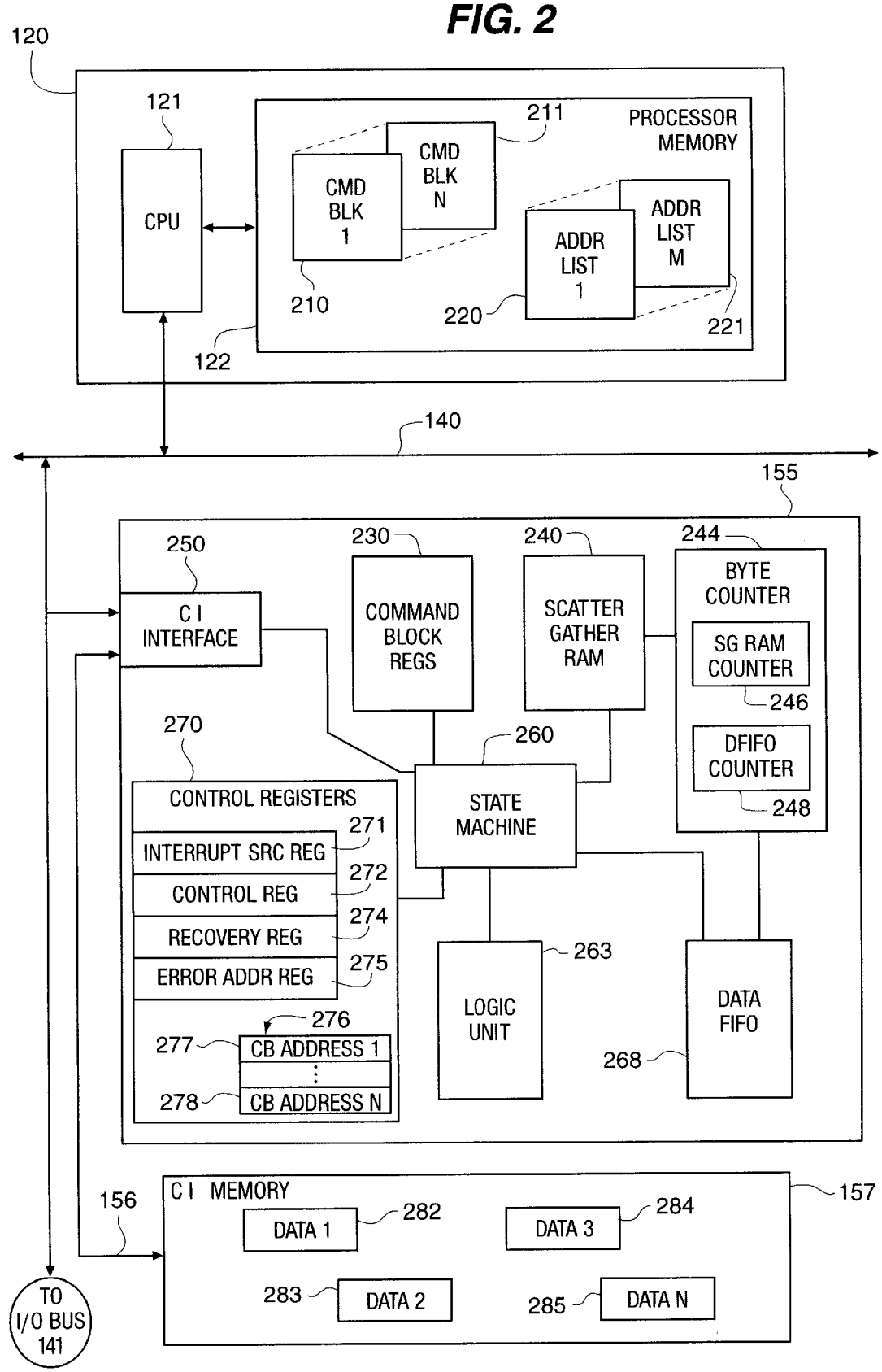
FIG. 2 illustrates details of the Cl and local processor in block diagram.

Architectural Overview FIGS. 1–2

FIG. 1 illustrates a system level view of a computing system 100 in the context of a RAID system. Using a RAID system as the basis for the present illustration is for example purposes only and is not intended as a limitation on the applicability of the present invention to other uses and/or inclusion in other computing system configurations. For example, the I/O controller 150 that includes the Cl 155 of the present invention can be implemented in many different contexts including, but not limited to, a device controller context as in the present RAID system example, an I/O bridge context between two I/O busses, a basic I/O controller context having access to only one I/O bus, or any other I/O bus configuration.

The primary components of computing system 100 include, but are not limited to, a computing device 110 and a storage device 160. Components of storage device 160 include, but are not limited to, a magnetic disk device interface 161 also known in the context of the present example as a RAID interface, and a disk array comprised of multiple magnetic disk devices 164–166.

Components of computing device 110 include, but are not limited to, a local processor complex 120, an external processor interface 130, a first and second I/O bus 140 and 141 respectively, and an I/O controller 150. Components of local processor complex 120 are operatively connected to the first I/O bus 140 and include, but are not limited to, a local processor 121 also known as a CPU, and a local processor memory 122. External processor interface 130 is operatively connected to the first I/O bus 140 and an external processor 131 in a manner that supports communication connectivity between the external host processor 131 and the first I/O bus 140. Components of I/O controller 150 include, but are not limited to, a first I/O bus interface 151 to first I/O bus 140, a second I/O bus interface 152 to second I/O bus 141, and a Cl 155 between the first and second I/O bus interfaces 151 and 152 respectively. Cl 155 is operatively connected to a memory 157 by way of memory bus 156 for use as a cache during data manipulations and/or data transfer operations. Details of Cl 155 components are disclosed in the text accompanying FIG. 2. The memory 157, also known as a cache, Cl memory, or I/O controller memory, is typically a volatile memory such as any of a variety of Random Access Memory (RAM) types including, but not limited to, a Dynamic RAM (DRAM) or preferably a Synchronous DRAM (SDRAM) that are both well known and widely available commercially in the industry.

FIG. 2 illustrates the component details of the Cl 155, local processor complex 120, and I/O controller memory 157, in block diagram form. Local processor complex 120 includes the components as stated in the text accompanying FIG. 1. The processor memory 122 of the local processor complex 120 is illustrated with contents including a set of n command blocks 210–211 and m scatter/gather address lists, the fields of which are disclosed in the text accompanying FIGS. 5–6.

The Cl 155 is a programmable, hardware accelerated, non-processor driven data processing engine comprised primarily of memory and registers interconnected by gated logic blocks. Because the Cl 155 does not include processor of software control intelligence, the Cl 155 is driven by gated signals in response to commands and/or specified register bits that are supplied by a source external to the Cl 155. The external source of commands that drive the Cl 155 can include, but is not limited to, the local processor complex 120 or any other source accessible to the Cl 155 by way of I/O busses 140 and/or 141. Timing for the Cl 155 is obtained from any one of two sources depending on the operation taking place. Interactions with the I/O bus 140 use the bus clock frequency. Interactions with the I/O controller memory 157 use the memory's clock frequency. Appropriate clock synchronization is made in any manner well known in the art to facilitate continuity of activities within the Cl 155 that cross clock boundaries. The following discussion includes a disclosure of the fundamental Cl 155 components in block diagram form. Details of the operational interactions among the fundamental Cl 155 components are disclosed in the text accompanying FIGS. 7–14.

The fundamental Cl 155 logic block components include, but are not limited to, the Cl interface 250, Command Block registers 230, Scatter/Gather (S/G) RAM 240, State Machine 260, Control Registers 270, Logic Unit 263, and a Data First-In-First-Out (DFIFO) 268. State machine 260 is the main control logic block for interactions and/or data transfers among the Cl 155 components listed above, in addition to controlling interactions and/or data transfers between any Cl 155 component and an external computing device and/or data storage device that is accessible to Cl 155 by way of I/O busses 140 and 141. State machine 160 control is accomplished by implementing the operational logic disclosed in the text accompanying FIGS. 3–14.

Cl interface 250 includes interfaces specific to any external I/O bus and the Cl I/O controller memory 157 in addition to a general front end or internal interface for the Cl 155 components. The portion of Cl interface 250 that acts as an interface to an external I/O bus includes the logic necessary to communicate with the I/O bus to which it is connected in that it can operate at the I/O bus clock frequency and pre-fetch bus addresses to maintain a zero wait state for Direct Memory Access (DMA) operations. The portion of Cl interface 250 that acts as an interface to the I/O controller memory 157 includes the logic necessary to communicate with the memory to which it is connected in that it can operate at the memory clock frequency and address and track the location of data written to and read from the I/O controller memory 157. The portion of Cl interface 250 that acts as an interface to the internal Cl 155 components includes the logic necessary to communicate with either the external I/O bus interface or the memory interface regardless of the potential differences in clock frequencies.

Command block registers 230 include at least one register to store the contents of specific fields of a command block. Details of a command block are disclosed in the text accompanying FIG. 5. Command block registers 230 also include a command decoder to determine the operation to perform for a given command.

Scatter/Gather (SG) RAM 240 is an internal or external storage area for Cl 155 that holds lists of source locations and destination locations of data being operated on by the Cl 155. The preferred SG RAM 240 is an internal storage area for reasons of improved performance. The lists of data locations are pointed to by Scatter/Gather Lists (SGLists), the details of which are disclosed in the text accompanying FIG. 6. SG RAM 240 is also accompanied by a Byte Counter 244 that contains the logic and registers necessary to determine the number of bytes being transferred for each SG RAM 240 cycle in the SG Counter 246. The Byte Counter 246 also includes a DFIFO Counter 248 to count the number of bytes transferred to or from DFIFO 268. The Byte Counter 244 exists so that neither the SG RAM 240 nor the DFIFO 268 is overrun with data.

Control registers 270 include the logic and registers that are necessary to maintain at least one command block address 277–278 in a Command Queue 276. The preferred command queuing scheme is First-in-First-out, however, any other queuing scheme can be used. The command block addresses 277–278 identify the location of individual control blocks that exist in locations external to Cl 155. Control registers 271–275 are used to control Cl 155 and/or pass information between the local processor 121 and Cl 155. Relevant control registers include, but are not limited to, Interrupt Source register 271, Control register 272, Recovery Register 274, and Error Address register 275. The Interrupt Source register 271 includes bit positions for reporting a variety of error interrupt types including, but not limited to, Command Complete, Verify error, ECC Check Fail, Programming error, Illegal Command, and Bad Address error. The Control register 272 includes bit positions for use in controlling the operation of Cl 155 including, but not limited to, the Memory Location bit. The Recover register 274 includes bit positions for use by local processor 121 to communicate to Cl 155 that further command processing and execution may proceed following the various error interrupts including, but not limited to, the Recovery bit. The Error Address register 275 is used to hold the address of error locations that correspond to the errors reported in the Interrupt Source register 271.

Logic unit 263 includes the logic and registers necessary to perform logical operations on data. The logical operation being performed on the data is controlled and/or coordinated by state machine 260.

DFIFO 268 includes the logic and/or registers necessary to sequentially store and retrieve data being input and output during specific data manipulation operations and as data is being stored and retrieved from the larger I/O controller memory 157. Preferably, DFIFO 268 is a minimum size interleaved RAM that is at or about 512 k bytes.

Figure 3:
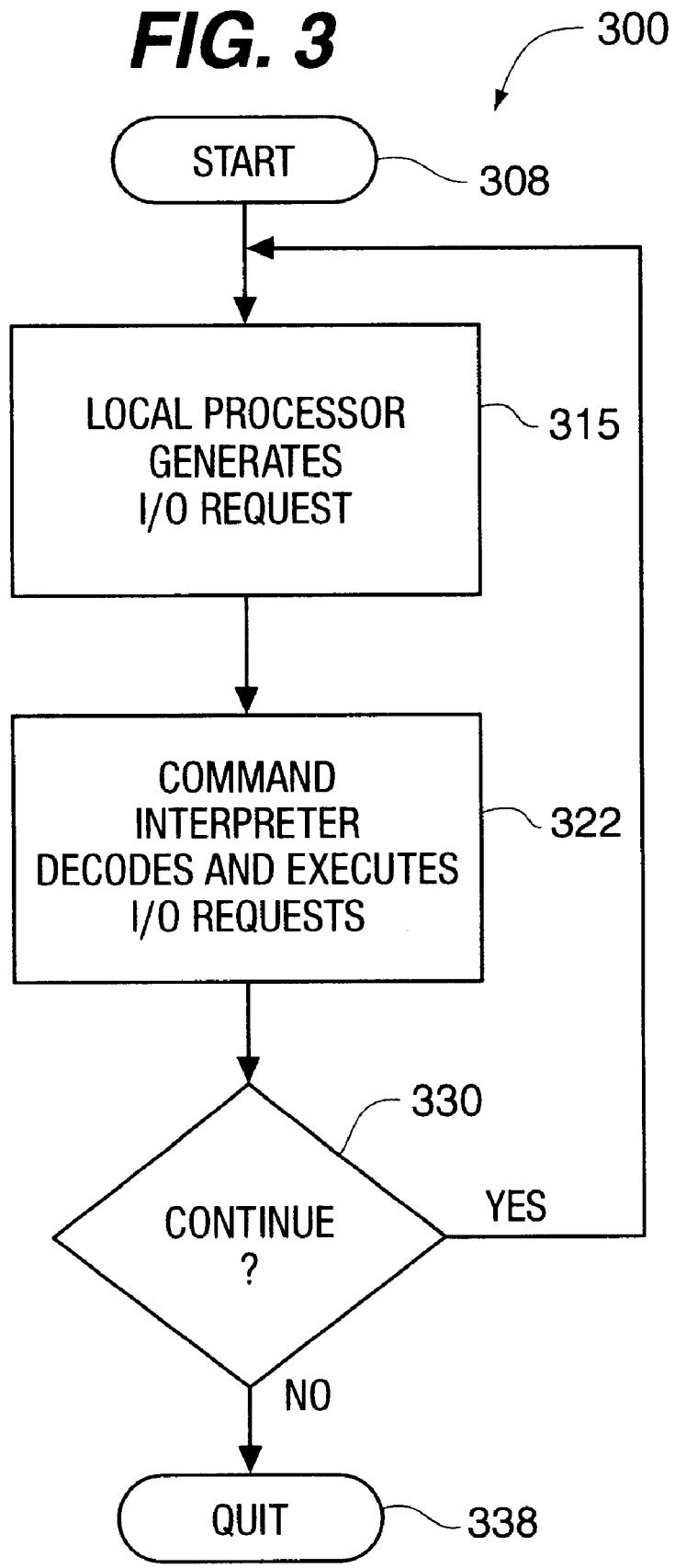
FIG. 3 illustrates the operational steps in flow diagram form for the improved Cl system of the present invention.

Operational Overview FIG. 3

FIG. 3 illustrates an overview of the operational steps 300 in flow diagram form for the improved Cl system of the present invention. The operational steps 300 begin at step 308 and proceed to step 315 where an I/O request is generated by the local processor 121 on behalf of a requesting entity such as the local processor 121 itself or an external processor 131. An I/O request is a request to manipulate data, or read data or write data from a source location to a destination location. Both the source location and the destination location must be accessible by way of at least one common I/O bus. For example in the context of FIG. 1, the source and destination locations of data can both be on I/O bus 140. Similarly, the source and destination locations of data can be on separate I/O busses 140 and 141 respectively where both busses 140 and 141 are accessible by way of an I/O bus bridge provided by I/O controller 150. Details of the I/O request generating steps are disclosed in the text accompanying FIGS. 4–6.

At step 322, the Cl 155 portion of the I/O controller 150 decodes and executes the specific tasks required to complete the I/O request previously generated at step 315. Details of the steps for decoding and executing an I/O request by the Cl 155 are disclosed in the text accompanying FIGS. 7–14.

If it is determined at decision step 330 that I/O request processing should continue, then processing continues at step 315 as previously disclosed. Alternatively, if it is determined at decision step 330 that I/O request processing should not continue, then processing stops at step 338.

Figure 4:
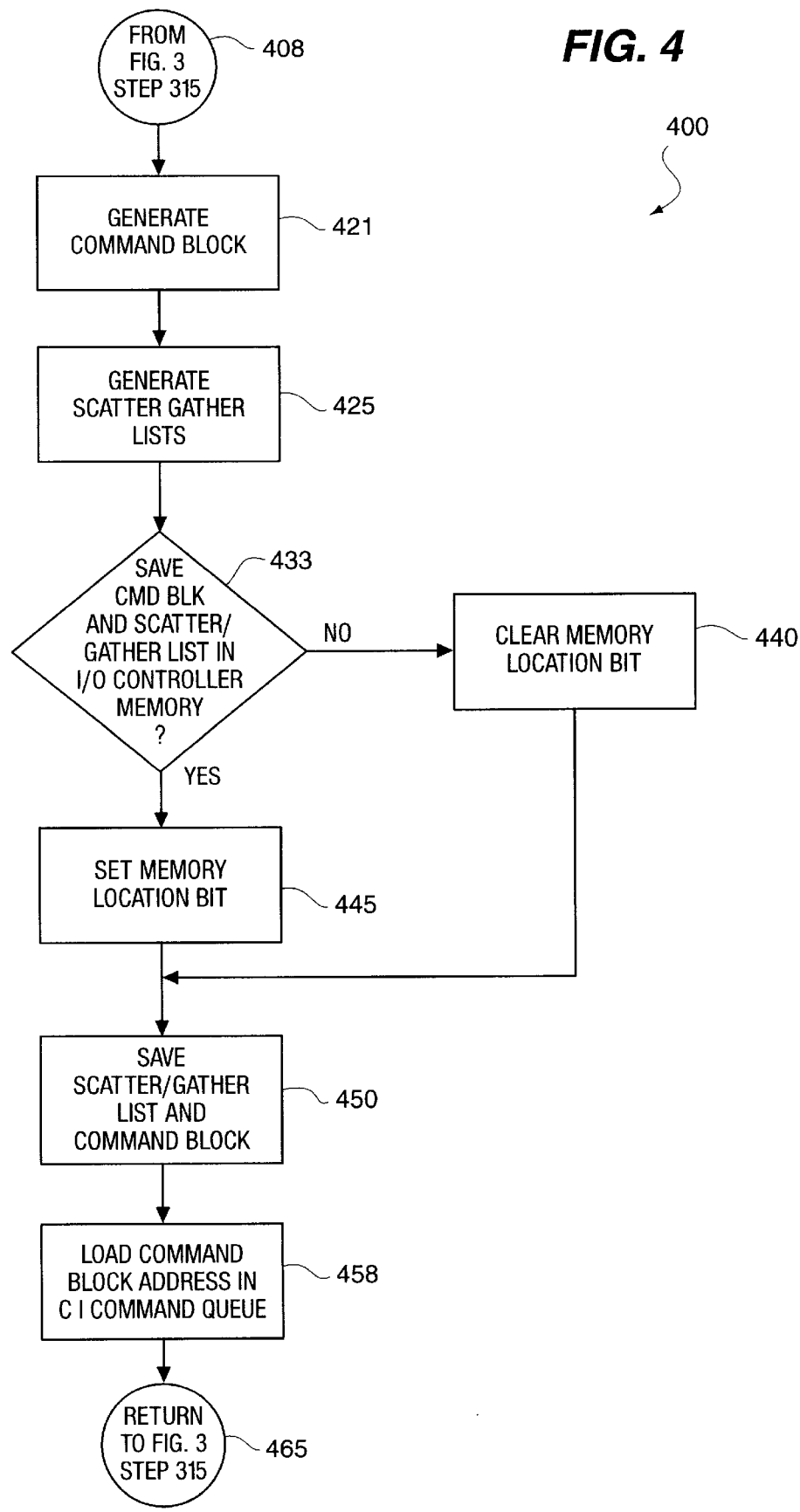
FIG. 4 illustrates the operational steps in flow diagram form for generating an I/O request for execution by the Cl.
Figure 5:
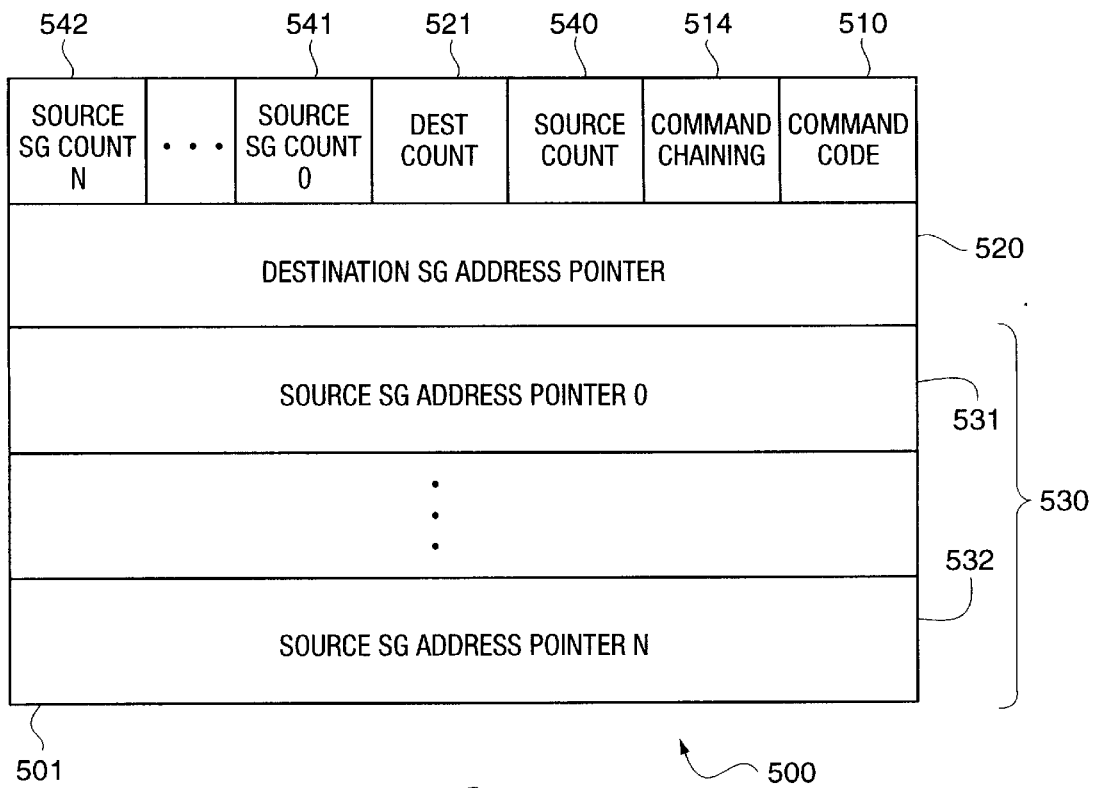
FIG. 5 illustrates a detailed field layout example of a command block.
Figure 6:
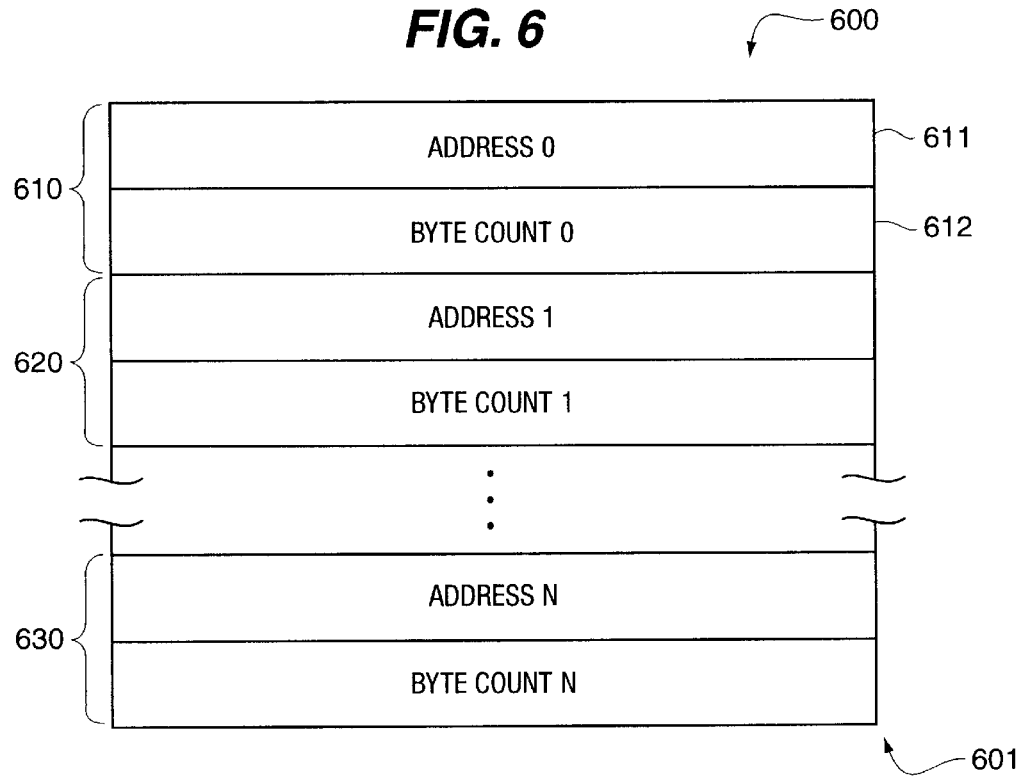
FIG. 6 illustrates a detailed example of scatter/gather list fields pointed to by a command block.

Generating An I/O Request—FIGS. 4–6

FIG. 4 illustrates the operational steps 400 in flow diagram form for generating an I/O request for execution by the Cl 155. The operational steps 400 begin at step 408 and are the details of step 315 in FIG. 3. The operational steps 400 are performed by the local processor 121 on behalf of itself or in cooperation with an external processor 131. At step 421, the local processor 121 generates a command block on behalf of the entity responsible for a given I/O request. A command block contains information necessary for the Cl 155 to execute the request. The contents of a command block can include, but are not limited to, the specific I/O command to execute and pointers to the relevant source and/or destination data locations. Details of the fields in an example command block are disclosed in the text accompanying FIG. 5.

A Scatter/Gather List corresponding to the command block of step 421, is generated at step 425 by either the local processor or an external processor. A scatter/gather list contains pointers to the source and/or destination locations of data being operated on by the I/O operation identified in the corresponding command block. Details of the fields in an example scatter/gather list are disclosed in the text accompanying FIG. 6.

Depending on the memory location where the entity requesting the I/O operation intends to store the command block and corresponding scatter/gather lists generated in steps 421 and 425, the Cl 155 must know how to interpret the location address being provided by the requesting entity. Any means of communicating this location information is considered within the scope of the present invention. One way to communicate the location information is to use a bit in a register that indicates whether the command block and scatter/gather lists are in a memory local to the Cl 155 or not. For example, if it is determined at decision step 433 that the command block and scatter/gather list of steps 421 and 425 are being saved in I/O controller memory local to the Cl 155, then the memory location bit in the control register 272 is set at step 445 to communicate the location information to the Cl 155. Alternatively, if it is determined at decision step 433 that the command block and scatter/gather list of steps 421 and 425 are being saved in non-I/O controller memory external to the Cl 155, then the memory location bit in the control register 272 is cleared to communicate the location information to the Cl 155. At step 450, the command block and accompanying scatter/gather list or lists are saved in a memory location as specified by the memory location bit.

At step 458, the local processor that generated the command block loads the command block address directly into the command queue 276. Loading a command block address in the command queue 276 signals the Cl 155 to begin processing an I/O request if processing is not already in progress. The I/O requests are typically processed in a FIFO manner. The operational steps 400 for generating an I/O request are complete at step 465 and processing returns to step 315 of FIG. 3.

Note that the local processor 121 can be interrupted by the Cl 155 at any time during operational steps 400. One reason the Cl 155 might interrupt the local processor 121 is to indicate that a command has successfully completed. The local processor 121 acknowledges a command complete interrupt by reading the Command Queue 276 to determine which command was the one that successfully completed. The local processor 121 typically carries out additional tasks in response to specific knowledge of which command has completed. The additional tasks performed by local processor 121 are beyond the scope of the present discussion.

FIG. 5 illustrates a field layout example 500 of a command block 501. The purpose of a command block is to identify the command to be executed and the data on which the command will operate. Key fields in the command block 501, for example, include the command to be executed as identified in the command code 510, the data destination is identified by the destination SG address pointer field 520, and the data source is identified by the source SG address pointer fields 530 comprised of n fields 531–532. Note that the size of a command block, the specific fields, field locations, and field sizes illustrated in the example command block 501 are for example purposes only and other configurations and sizes are considered within the scope of the present invention. The command block 501 can be a fixed number of fields or variable number of fields depending on the total number of scatter/gather address pointers 520 and 530.

The Command Code field 510 contains a unique code for each of a predetermined set of commands. The types of commands can include, but are not limited to, Initialize, Copy, Direct Memory Access (DMA) Read, DMA Write, XOR, Verify, Compare, and Error Correction Code (ECC) Check. Details of each command and the operation of each command are disclosed in the text accompanying FIGS. 9–14.

The destination SG address pointer 520 is an address that identifies the location of a destination scatter/gather list. The destination scatter/gather list contains the address and byte count of data locations where the results of a given data operation should be placed. The destination SG address pointer 520 is accompanied by a Destination Count field 521 that identifies the number of destination addresses and byte counts that exist in the destination scatter/gather list. The number of destination addresses and byte counts are known generically as elements of a scatter/gather list.

The source SG address pointers 530 are addresses that identify the location of respective source scatter/gather lists. The number of source scatter/gather lists in the command block 501 are identified in the Source Count field 540. Each source scatter/gather list contains an address and byte count of source data being used as input to a given data operation carried on by the Cl 155. Each data source pointer 531–532 is accompanied by a Source Scatter/Gather Count field 541–542 that identifies the number of elements in each source scatter/gather list.

The Command Chaining field 514 is a single bit used to indicate that the present command can be chained with at least one subsequent command thereby reducing the number of command complete interrupts generated by the Cl 155. Typically, when the Cl 155 completes a given data operation, an interrupt is generated to notify the local processor 121 that a given data operation has completed successfully. If the bit in the Command Chaining field 514 is set for the data operation identified in the present Command Block 501, then an interrupt is generated when the operation is complete. However, if the bit in the Command Chaining field 514 is clear, then no command complete interrupt is generated and the Cl 155 proceeds to the next data operation. Two ways command chaining can be useful are to tell the Cl 155 that at least one additional command is available for execution on the Command Queue 276, and to reduce the number of command complete interrupts generated by the Cl 155.

FIG. 6 illustrates a detailed example of scatter/gather list fields 600 in a scatter/gather list 601. The purpose of a scatter/gather list is to identify the data source and data destination of a given data operation. In the example scatter/gather list 601, there are n elements 610, 620–630 where an element includes key fields that include, but are not limited to, an address 611 and a byte count 612. The byte count field 612 represents the number of bytes of data at the location of the address 611. A zero value in a byte count field indicates an unused element in the scatter/gather list.

No distinction is made between a destination scatter/gather list and a source scatter/gather list without knowing which field in command block 501 points to which scatter/gather list 601. However, only destination addresses are included in a destination scatter/gather list and only source addresses are included in a source scatter/gather list. Note that the size of any scatter/gather list and the specific fields therein, and the field locations and field sizes in the example scatter/gather list 601 are for example purposes only. The number elements in the destination scatter/gather list is a function of the Cl 155 word size and/or the number of bits allocated for a count field which can limit the largest number that can be represented to numbers such as 13, 32, 64 or 128 for example. Other configurations and sizes are considered within the scope of the present invention.

Figure 7:
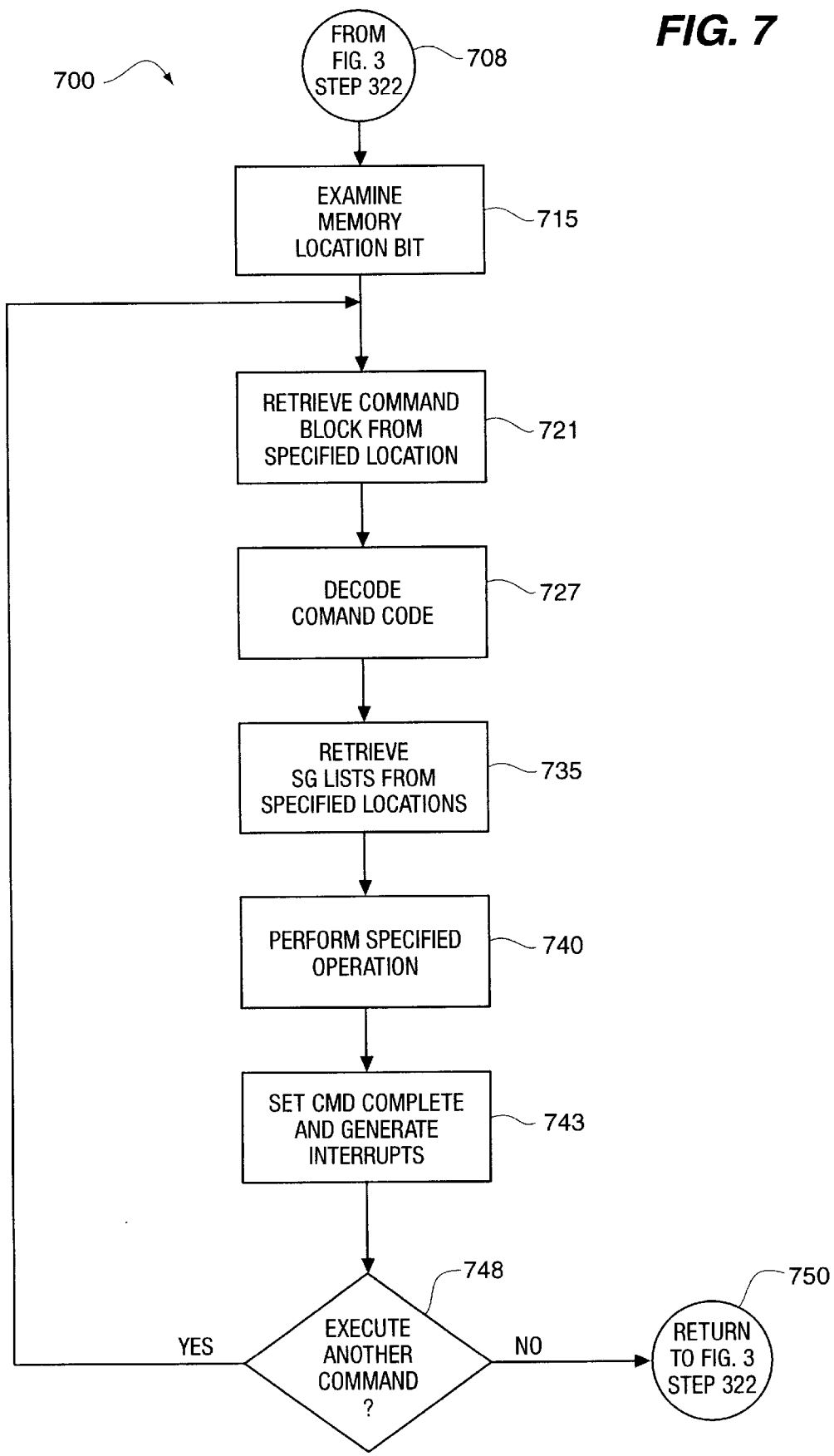
FIG. 7 illustrates an overview of the operational steps taken by the Cl to retrieve a command block and execute an I/O request.
Figure 8:
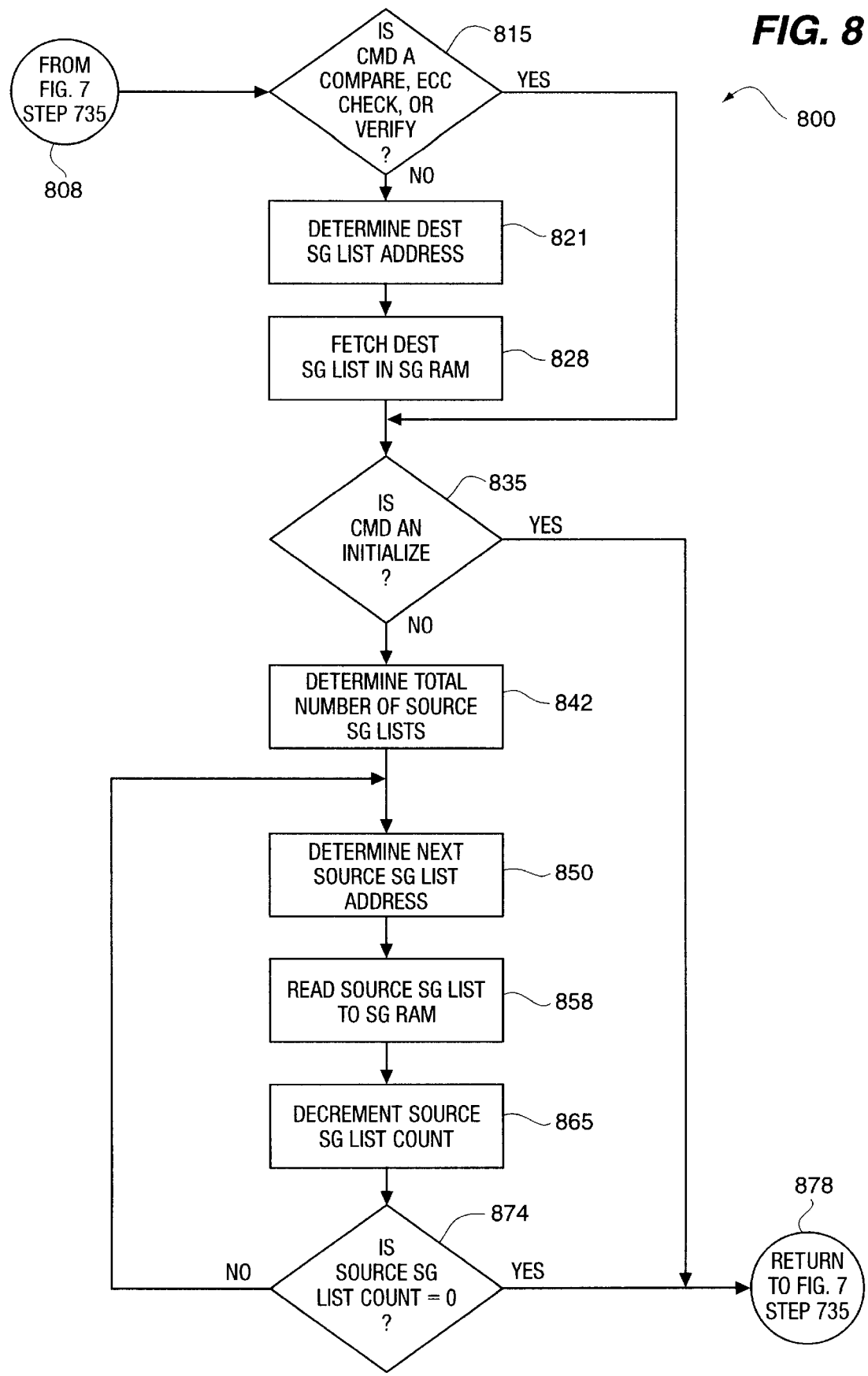
FIG. 8 illustrates the operational steps for locating and loading a source and/or destination scatter/gather list into a memory local to the Cl.

I/O Request Execution Setup—FIGS. 7–8

FIGS. 7–8 illustrate the details of the Cl 155 operational steps that are taken to set up an I/O request for execution. Specifically, FIG. 7 illustrates an overview of the operational steps 700 taken by the Cl 155 to set up and execute an I/O request in response to the local processor 121 placing the address of a command block 501 into the command queue 276. The operational steps 700 begin at step 708 and are the details of step 322 in FIG. 3.

At step 715, the Cl 155 examines the memory location bit in the control register 272 to determine whether the command block 501 and corresponding scatter/gather lists 601 are located in a memory local to the Cl 155 or in a memory external to the Cl 155. The determination is made in view of the memory location bit being set or cleared.

At step 721, the Cl 155 retrieves an address of a command block 501 from the command queue 276 and moves the command block contents from the specified address to the command block registers 230 within the Cl 155. The addresses 277–278 in command queue 276 are preferably retrieved in FIFO order.

At step 727, the command code 510 of command block 501 is decoded to identify the specific operation that is the subject of the present I/O request task that the Cl 155 is to execute. Each one of a plurality of commands is identified by a unique combination of a plurality of bits that comprise the command code 510 field. The number of commands that can be represented by the command code 510 field is limited by the number of unique combinations that can be represented by the plurality of bits that comprise the command code 510 field.

At step 735, the address of each source and/or destination scatter/gather list 601 is retrieved in turn from the command block registers 230 as the corresponding scatter/gather lists themselves are moved from the specified address locations to the scatter/gather RAM 240. Details of retrieving a scatter/gather list 601 is disclosed in the text accompanying FIG. 8.

At step 740, a specific task is performed that is the substance of the command identified in step 727. Depending on which command was identified in step 727, the Cl 155 logic is designed to perform different tasks and/or sub-tasks under the control of state machine 260 in cooperation with other of the logic blocks 230–270 within Cl 155. Details of the variety of steps performed by the Cl 155 for each unique command identified by a given command code 510 can include, but are not limited to, the steps disclosed in the text accompanying FIGS. 9–14.

At step 743, the Cl 155 sets the Command Complete bit in the Interrupt Source register 271, and generates an interrupt for the local processor 121 depending on the state of the command chaining bit 514 for the just completed command as previously disclosed in the text accompanying FIG. 5. The type of interrupt generated depends on whether the command completed successfully without an error or unsuccessfully with an error. In general at decision step 748, processing will continue at step 721 for a just executed command that completed successfully without an error. However, processing will continue for a just executed command that completed unsuccessfully with an error only after the Cl 155 is expressly restarted by the local processor 121 by setting the Recovery bit in the Recovery register 274. Note that while the Cl 155 is halted due to an error, the local processor 121 can remove a command from the command queue 276 as necessary in response to the error.

Alternatively, if it is determined at decision step 748 that no additional commands are in the command queue 276 for execution by the Cl 155, then processing continues at step 750 by returning to step 322 of FIG. 3.

Types of errors that can occur during command execution and the error interrupts that the Cl 155 can generate in response to each type of error can include, but are not limited to, the list set forth below.

Verify Error—If during execution of a Verify command a "1" is detected in the data pattern being verified, the Cl 155 sets a Verify Error bit in the Interrupt Source register 271 and the Cl 155 halts. An address of the specific location of the error or an address in the vicinity of the error, is placed in the Error Address register 275. Similarly, a verify error can occur during execution of a Compare command. For example, if during the read of the last source data the result of the Compare command's XOR operation contains a "1" in the previously accumulated data, then the Cl 155 sets the Verify Error bit in the Interrupt Source register 271 and the Cl 155 halts. An address of the specific location of the error or an address in the vicinity of the error, is placed in the Error Address register 275.

Cl ECC Check Fail—If during execution of an ECC_Check command multiple un-correctable ECC errors are detected in the data pattern being checked, or if during execution of any other command a data read causes multiple un-correctable ECC errors, the Cl 155 sets the ECC Check Fail bit in the Interrupt Source register 271 and the Cl 155 halts. Similarly, if the address of a command block from the command queue 276 does not agree with the memory location bit in the control register 272, then the Cl 155 sets the Programming Error bit in the Interrupt Source register 271 and the Cl 155 halts. An address of the specific location of the error or an address in the vicinity of the error, is placed in the Error Address register 275.

Programming Error—A programming error can occur in the context of any command being executed by the Cl 155. For example, if during execution of a DMA read or write operation it is determined that the contents of the source count field 540 in command block 501 is not equal to 1, the Cl 155 sets the Programming Error bit in the Interrupt Source register 271 and the Cl 155 halts.

Illegal Command—If the command code field 510 of a given command block 501 contains a code that does not identify a known command, the Cl 155 sets the Illegal Command bit in the Interrupt Source register 271 and the Cl 155 halts.

Bad Address Error—If, for example, a device on either bus 140, 141, or 156 fails to respond to an addressed request from Cl Interface 250, then the Cl 155 sets the Bad Address bit in the Interrupt Source register 271 and the Cl 155 halts. An address of the specific location of the error or an address in the vicinity of the error, is placed in the Error Address register 275.

FIG. 8 illustrates the operational steps 800 for locating and loading a source and/or destination scatter/gather list 601 into I/O controller memory 157 local to the Cl 155. The operational steps 800 begin at step 808 and are the details of step 735 in FIG. 7. One purpose of operational steps 800 is to retrieve the actual scatter/gather lists pointed to by the command block 501 into a fast directly accessible memory local to the Cl 155. Note that the scatter/gather lists originate in either a local memory or an external memory as indicated by the Memory Location bit in the Control register 272 as previously disclosed.

If it is determined at decision step 815 that the decoded command code 510 indicates that the command of the present command block 501 is either a Compare, ECC Check, or Verify command, then no destination scatter/ gather list exists and processing continues at step 835. Alternatively, if it is determined at decision step 815 that the decoded command code 510 indicates that the command of the present command block 501 is not a Compare, ECC Check, or Verify command, then a destination scatter/gather list exists and processing continues at step 821. At step 821 the destination scatter/gather list address pointer 520 is retrieved from the immediate command block 501. At step 828, the destination scatter/gather list 601 is retrieved from the designated location and loaded into memory 157 local to the Cl 155.

If it is determined at decision step 835 that the decoded command code 510 is an Initialize command, then no source scatter/gather list exists and processing continues at step 878. Alternatively, if it is determined at decision step 835 that the decoded command code 510 is not an Initialize command, then processing continues at step 842 to begin a loop to fetch at least one source scatter/gather list into memory local to the Cl 155. At step 842, the total number of source scatter/gather lists 530 is determined by reading the Source Count field 540 from the command block 501. At step 850, the address of the next source scatter/gather list is retrieved from the command block 501. At step 858, a copy of the next source scatter/gather list is moved from its origin to I/O controller memory 157 local to the Cl 155. The source scatter/gather list count is decremented by one and if it is determined at decision step 874 that the source scatter/gather list count is not zero, then processing continues to loop at step 850 as previously disclosed. Alternatively, if it is determined at decision step 874 that the source scatter/gather list count is equal to zero, then processing continues at step 878 by returning to step 735 of FIG. 7.

Command Execution—FIGS. 9–14

FIGS. 9–14 illustrate the fundamental logic of the various commands in flow diagram form. The illustrations are controlled with counters that may increment or decrement and the counters may be tested for a greater than or less than or equal to condition depending on the implementation and depending on whether counting begins or ends with 0 or 1. All variations used to control the logic of a given command are considered within the scope of the present invention. Further, each of the commands executed by the Cl 155 that read and write data, is based on a design such that there are multiple sets of reads of source data for each write to a destination address pointed to by the destination scatter/gather list. This multiple read for each write results in highly efficient execution of I/O operations. The present examples in FIGS. 9–14 are for example purposes only and are not intended as the only implementation of each command.

Figure 9:
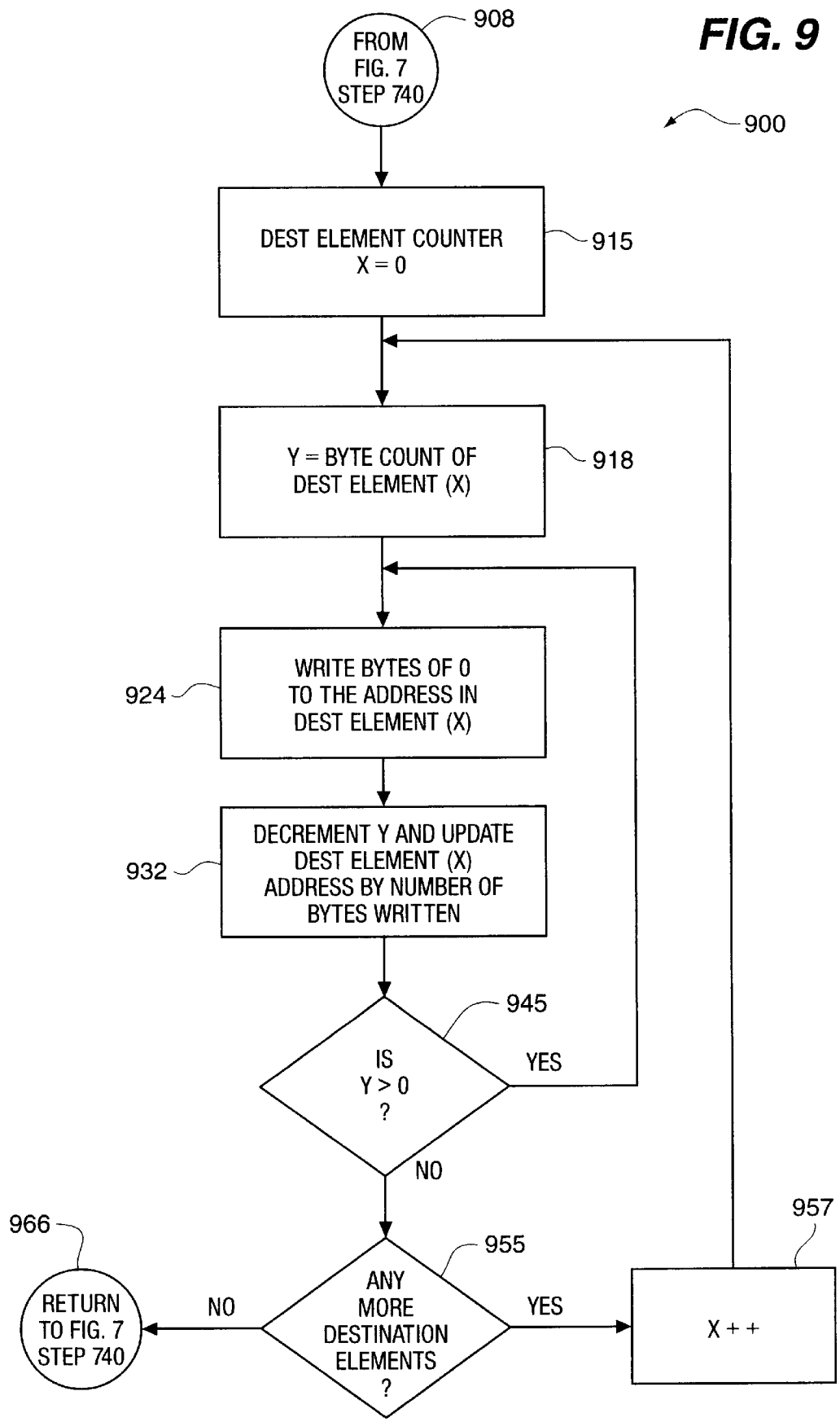
FIG. 9 illustrates the operational steps for executing an Initialize command.

FIG. 9 illustrates the operational steps 900 for executing the Initialize command. The operational steps 900 begin at step 908 and are the details of step 740 in FIG. 7. One purpose of the Initialize command is to clear or zero out an area of memory by writing zero's to the memory.

At step 915, a destination element counter x is initialized to 0 to represent the first destination element in the destination scatter/gather list 601. At step 918, a counter y is initialized to the byte count 612 of the number of bytes of data stored at the location pointed to by the address destination element (x). At step 924, bytes of the value 0 are written to the address in destination element (x) by way of the Cl interface 250. The number of bytes that are written to the address in destination element (x) for a given write operation depends on the Cl interface 250 and memory bus bandwidth serving the memory 157. The typical write operation may be a quad word per cycle.

At step 932, the byte counter y is decremented by the number of bytes written in step 924 and the address in the destination element (x) is updated to point to a new address that reflects the number of bytes previously written in step 924. If it is determined at decision step 945 that the byte counter y remains greater than zero, then there are additional bytes of the value 0 to write to the address in the destination element (x) and processing continues at step 924 as previously disclosed. Alternatively if it is determined at decision step 945 that the byte counter y is less than or equal to zero, then processing continues at step 955.

If it is determined at decision step 955 that there are more destination elements to process in the destination scatter/gather list in view of the total number of destination elements specified in the Destination Count 521, then the destination element counter x is incremented to represent the next destination element (x) and processing continues at step 918 as previously disclosed. Alternatively if it is determined at decision step 955 that there are no more destination elements in the present destination scatter/gather list, then processing continues at step 966 by returning to step 740 in FIG. 7.

Figure 10:
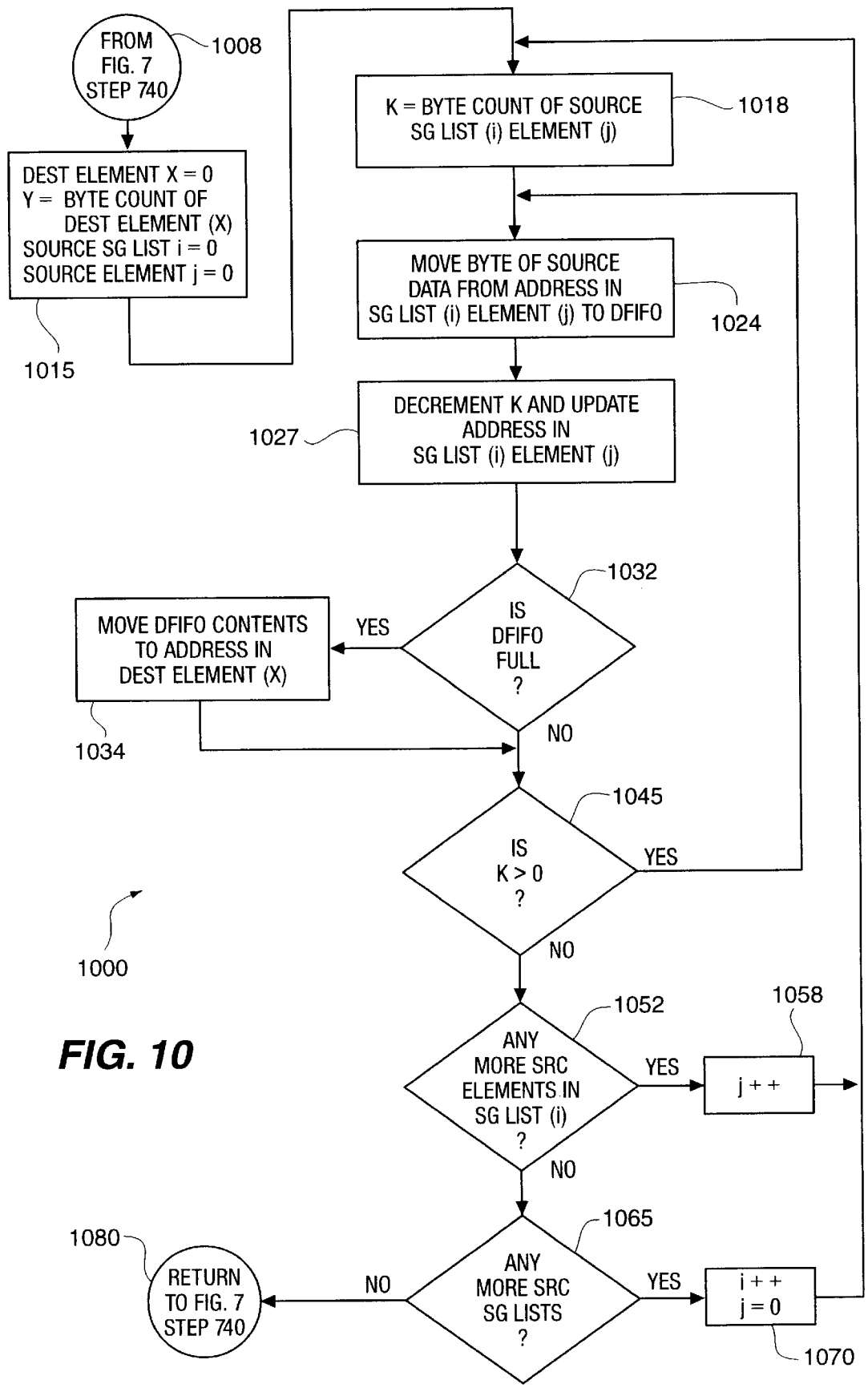
FIGS. 10–11 illustrate the operational steps for executing a Copy command, DMA Read, and a DMA Write.
Figure 11:
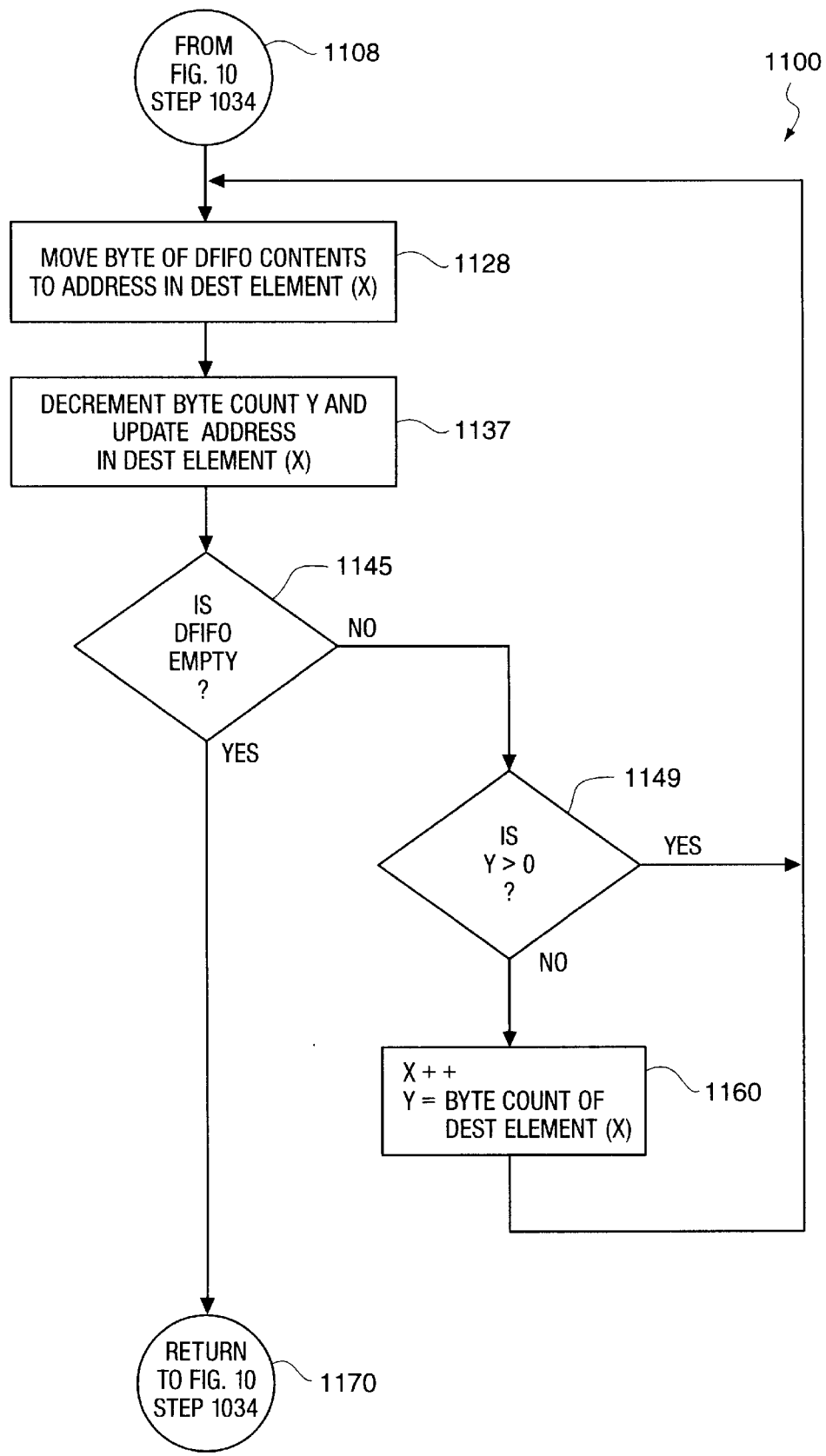

FIGS. 10–11 illustrate the operational steps for commands including, but not limited to, a Copy command, a DMA Read, and a DMA Write, wherein each command is designed to move data from a source location to a destination location. Specifically, FIG. 10 illustrates the steps for filling the DFIFO 268 with data from a source location and FIG. 11 illustrates the steps for emptying the DFIFO 268 to a destination location. One purpose of the Copy command is to move data from and to source and destination locations within local I/O controller memory 157. The intended purpose of the DMA Read command is to move data from a source location in non-I/O controller memory to a destination location in local I/O controller memory 157. Alternatively, one purpose of the DMA Write command is to move data from a source location in local I/O controller memory 157 to a destination location in non-I/O controller memory. Details of the Copy, DMA Read, and DMA Write operational steps are disclosed below.

FIG. 10 illustrates the operational steps 1000 for moving data from a source location to the DFIFO 268. The operational steps 1000 begin at step 1008 and are the details of step 740 in FIG. 7. At step 1015, several counters and variables are initialized. The destination element counter x is initialized to 0 to represent the present destination scatter/gather list element on which the present command is operating. The counter y is initialized to the byte count 612 representing the number of bytes at the location pointed to by destination element (x). The counter i is initialized to 0 to represent the present source scatter/gather list on which the present command is operating. The counter j is initialized to 0 to represent the present source element in source scatter/gather list (i) being operated on by the present command. Finally, at step 1018, the counter k is initialized to the byte count 612 representing the number of bytes at the location pointed to by source scatter/gather list (i) element (j).

At step 1024, at least one byte of data is moved from the source address in the source scatter/gather list (i) element (j) to the DFIFO 268. At step 1027, the counter k representing the byte count of the source scatter/gather list (i) element (j) is decremented by the number of bytes moved in step 1024 and the address in the source scatter/gather list (i) element (j) is updated to reflect the number of bytes moved in step 1024.

If it is determined at decision step 1032 that the DFIFO 268 is full, then the contents of DFIFO 268 are moved to the location pointed to by the address in destination element (x) at step 1034 and processing continues at step 1045. Details of moving the contents of DFIFO 268 to the location pointed to by the address in destination element (x) is disclosed in FIG. 11. Alternatively, if it is determined at decision step 1032 that the DFIFO 258 is not full, then processing continues at step 1045.

If it is determined at decision step 1045 that the byte counter k is greater than zero, then processing continues to fill the DFIFO 268 at step 1024 as previously disclosed. Alternatively, if it is determined at decision step 1045 that the byte counter k is less than or equal to zero, then processing continues at step 1052. If it is determined at decision step 1052 that there are more source elements to process in the source scatter/gather list (i) in view of the total number of available destination elements in Source SG Count (i) 541–542, then the source element counter j is incremented and processing continues to fill DFIFO 268 at step 1018 as previously disclosed. Alternatively if it is determined at decision step 1052 that there are no more source elements in the source scatter/gather list (i), then processing continues at step 1065.

If it is determined at decision step 1065 that there are more source scatter/gather lists among the total number of source scatter/gather lists in Source Count 540, then at step 1070 the source scatter/gather list counter (i) is incremented and the source element counter (j) is reinitialized to point to the first element in the next source scatter/gather list. Processing then continues to fill the DFIFO 268 at step 1018 as previously disclosed. Alternatively, if it is determined at decision step 1065 that there are no more source scatter/gather lists among the total number of source scatter/gather lists in Source Count 540, then processing continues at step 1080 by returning to step 740 in FIG. 7.

FIG. 11 illustrates the operational steps 1100 for moving the contents of DFIFO 268 to a destination location pointed to by the address in destination element (x). The operational steps 1100 begin at step 1108 and are the details of step 1034 in FIG. 10. More particularly, the operational steps 1100 that move data out of DFIFO 268 are substantially similar to the operation steps 1000 that move data into DFIFO 268.

At step 1128, at least one byte of the contents of the DFIFO 268 are moved to the memory location pointed to by the address in the destination scatter/gather element (x). At step 1137, the byte counter y is decremented by the number of bytes moved in step 1128 and the address in the destination scatter/gather element (x) is updated to reflect the number of bytes moved in step 1128. If it is determined at decision step 1145 that DFIFO 268 is not empty yet, then processing continues at step 1149. Alternatively, if it is determined at decision step 1145 that DFIFO 268 is empty, then processing continues at step 1170 by returning to step 1034 in FIG. 10.

If it is determined at decision step 1149 that the byte counter y is greater than zero, then processing continues to move the contents of DFIFO 268 to the destination memory location at step 1128 as previously disclosed. Alternatively, if it is determined at decision step 1149 that the byte counter y is less than or equal to zero, then at step 1160 the destination scatter/gather element counter x is incremented to point to the next destination scatter/gather element and the byte counter y is reinitialized to reflect the byte count of destination scatter/gather element (x). Processing continues to move the contents of DFIFO 268 to the destination memory location at step 1128 as previously disclosed.

Figure 12:
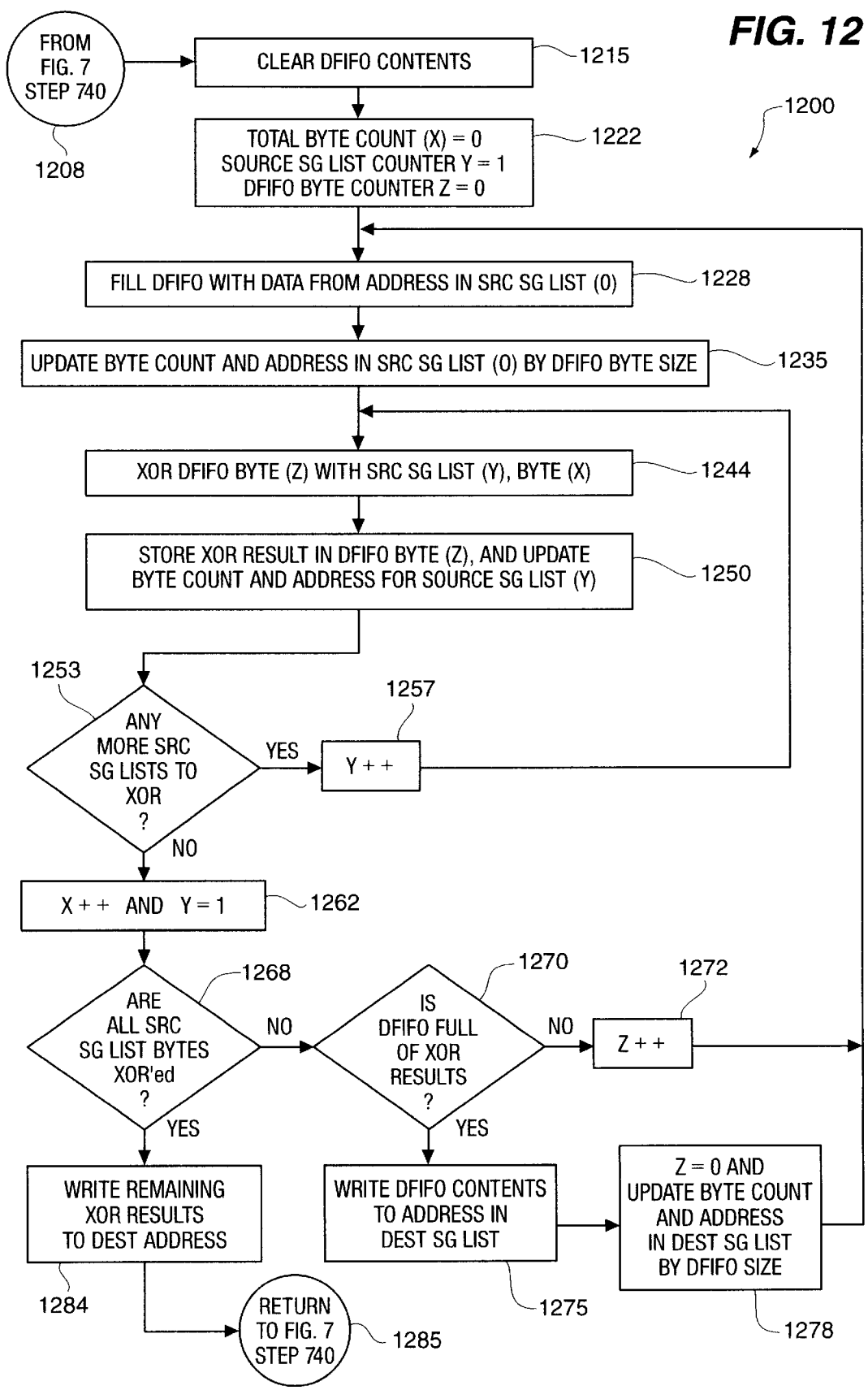
FIG. 12 illustrates the operational steps for executing an XOR command.

FIG. 12 illustrates the operational steps 1200 for the Exclusive-OR (XOR) command. One purpose of the XOR command is to perform an XOR operation on data pointed to by the source scatter/gather list and place the XOR operation result in the location pointed to by the destination scatter/gather list. More particularly, the preferred XOR command is a cumulative XOR command because the XOR results are accumulated across common byte positions of multiple blocks of source data and temporarily stored in DFIFO 268 until the DFIFO is full. Further, for each of the multiple sets of reads and XOR manipulations on the source data, there is one write of DFIFO 268 contents to a destination address pointed to by the destination scatter/gather list. This multiple read for each write results in highly efficient execution of I/O operations. Note that for purposes of the present example, all source scatter/gather lists each have the same byte count. FIG. 12 begins at step 1208 and represents the details of step 740 in FIG. 7.

At step 1215, the DFIFO 268 is cleared. At step 1222, a counter x is initialized to represent the total number of bytes that have been operated on at any given time during the XOR command. In addition, a counter y is initialized to 1 to identify the second source scatter/gather list when counting the lists from 0-n, and a DFIFO byte counter z is initialized to 0 to identify the first byte position in a DFIFO 268.

At step 1228, DFIFO 268 is filled with data from the memory location pointed to by the address in source scatter/gather list (0), and at step 1235 the byte count and address in source scatter/gather list (0) are updated by the size of DFIFO 268 or the number of bytes just moved into DFIFO 268. At step 1244, byte (z) of DFIFO 268 is XOR'ed with the byte (x) of source scatter/gather list (y) and at step 1250 the result of the XOR operation is stored in byte (z) of DFIFO 268. Also at step 1250, the byte count for source scatter/gather list (y) is updated to indicate that another byte has been processed, and the address in the source scatter/gather list (y) is updated to point to the next byte in list (y). Note that although the total byte count for each scatter/gather list is the same, it is understood that a byte count is maintained for each element of each scatter/gather list because the number of elements and the size of each block of data associated with each element can vary from one scatter/gather list to the next. Thus, there is a need to continually update the address in scatter/gather list (y) and its corresponding byte count for each time step 1250 is encountered.

If it is determined at decision step 1253 that there are more source scatter/gather lists that have not yet had byte position (x) XOR'ed, then the source scatter/gather list counter y is incremented at step 1257 and XOR processing continues at step 1244 as previously disclosed. The XOR operation itself is performed by loading byte (x) of a given source scatter/gather list into the Logic Unit 263 where the byte (x) is XOR'ed with byte (z) of DFIFO 268. Alternatively, if it is determined at decision step 1253 that all source scatter/gather lists have had byte position (x) XOR'ed, then total byte counter x is incremented to point to a next byte in the respective source scatter/gather lists and source scatter/gather list counter y is reinitialized to point to the second source scatter/gather list in preparation for the next round of XOR operations.

If it is determined at decision step 1268 that all bytes of each source scatter/gather list has been XOR'ed, then any remaining XOR results in DFIFO 268 are moved to the memory location pointed to by the address in destination scatter/gather list at step 1284 and processing is complete at step 1285 by returning to step 740 in FIG. 7. Alternatively, if it is determined at decision step 1268 that all bytes of each source scatter/gather list have not been XOR'ed, then processing continues at step 1270.

If it is determined at decision step 1270 that DFIFO 268 is not full of XOR results, then the DFIFO counter z is incremented at step 1272 to point to the next byte in DFIFO 268 and XOR processing continues at step 1228 as previously disclosed. Alternatively, if it is determined at decision step 1270 that DFIFO 268 is full of XOR results, then at step 1275 the XOR results in DFIFO 268 are moved to the memory location pointed to by the appropriate address in the destination scatter/gather list. At step 1278, the DFIFO counter z is reinitialized to point to the first byte in DFIFO 268, and the byte count and address in the destination scatter/gather list are updated by the size of DFIFO 268. XOR processing then continues at step 1228 as previously disclosed.

Figure 13:
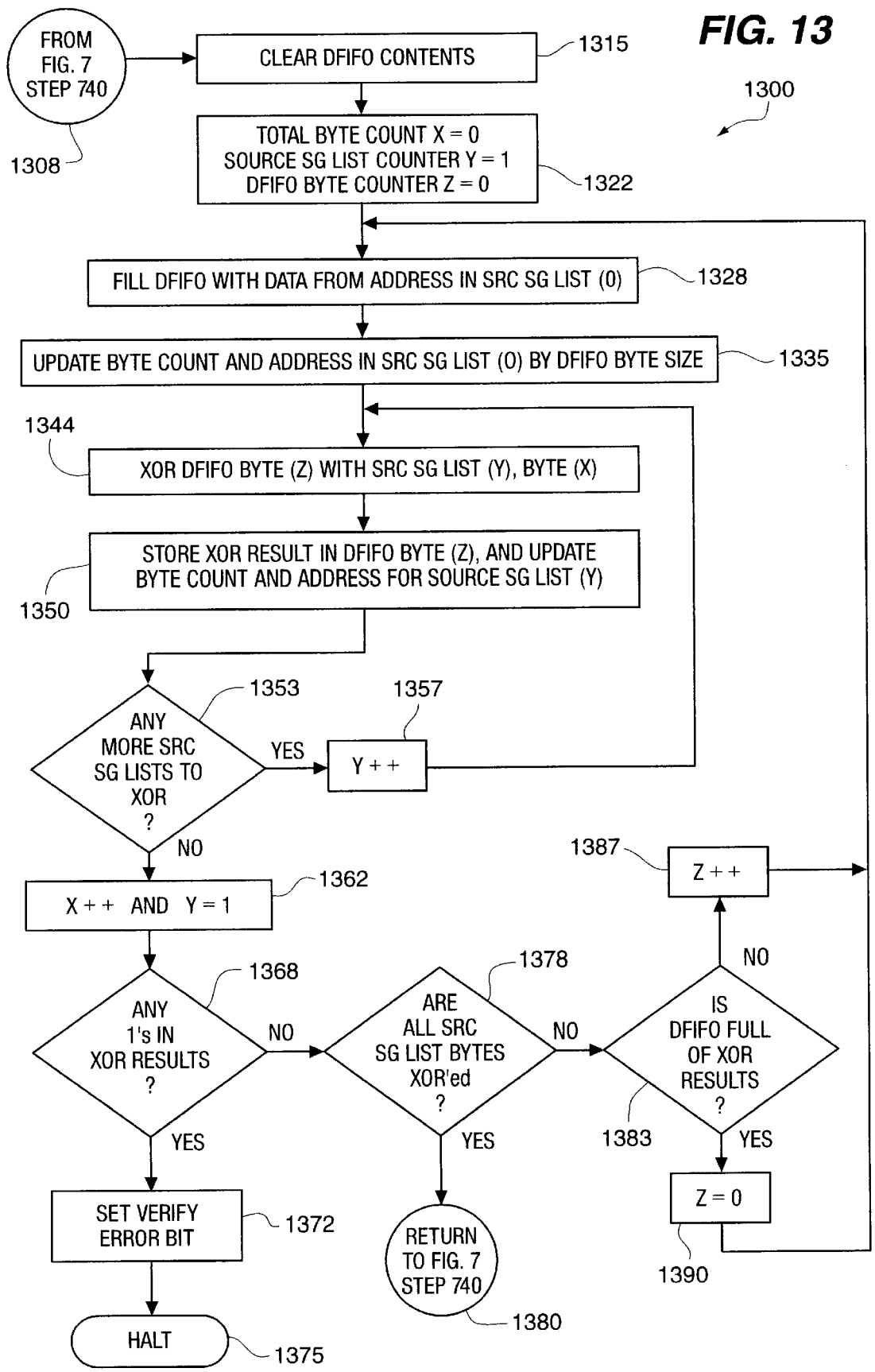
FIG. 13 illustrates the operational steps for executing a Compare command.

FIG. 13 illustrates the operational steps 1300 for performing a Compare command. One purpose of the Compare command is to perform a data and parity corruption check on user data and its corresponding parity data. The Compare command performs this check for corrupted user data and/or parity data by XOR'ing user data against itself and against the corresponding parity data so that the final XOR result produces all zero values for each byte of uncorrupted data and a one value for each corrupted byte of data. For this reason, the Compare command is essentially the XOR command of FIG. 12 with the addition of a test for 1 values in the results of the XOR operation. More specifically, steps 1308 through 1362 of FIG. 13 are identical to the steps 1208 through 1262 of FIG. 12 inclusive. However for purposes of executing a Compare command, in addition to the n source scatter/gather lists that point to user data, there exists one additional source scatter/gather list that points to the parity data that corresponds to the user data. Further, the result of the XOR operations of a Compare command are not saved at any destination location. The following discussion discloses details of operational steps 1300 that occur subsequent to step 1362 in FIG. 13 that are distinguishable from the operational steps 1200 of FIG. 12.

If it is determined at decision step 1368 that there are any 1 values in the XOR results from step 1344, then at step 1372 a Verify Error bit is set in the Interrupt Source register 271 and the Cl 155 halts at step 1375. An address of the data location at or near the source of the Compare error is also stored in the Error Address register 275 by the Cl 155. The Cl 155 remains halted at step 1375 until the Recovery bit is set in the Recover register 274. Alternatively, if it is determined at decision step 1368 that there are no 1 values in the XOR results from step 1344, then processing continues at step 1378.

If it is determined at decision step 1378 that all bytes of each source scatter/gather list have been XOR'ed, then processing is complete at step 1380 by returning to step 740 in FIG. 7. Alternatively, if it is determined at decision step 1378 that all bytes of each source scatter/gather list have not been XOR'ed, then processing continues at step 1383.

If it is determined at decision step 1383 that DFIFO 268 is not full of XOR results, then the DFIFO counter z is incremented at step 1387 to point to the next byte in DFIFO 268 and Compare processing continues at step 1328 as previously disclosed. Alternatively, if it is determined at decision step 1383 that DFIFO 268 is full of XOR results, then at step 1390 the DFIFO counter z is reinitialized to point to the first byte in DFIFO 268 and Compare processing continues at step 1228 as previously disclosed. Note that it is considered within the scope of the present invention to execute the operational steps of the Compare command in a manner that evaluates the XOR results on a byte by byte basis in the Logic Unit 263 and evaluating the XOR results in DFIFO 268 as disclosed in steps 1350 and 1383 for example.

Figure 14:
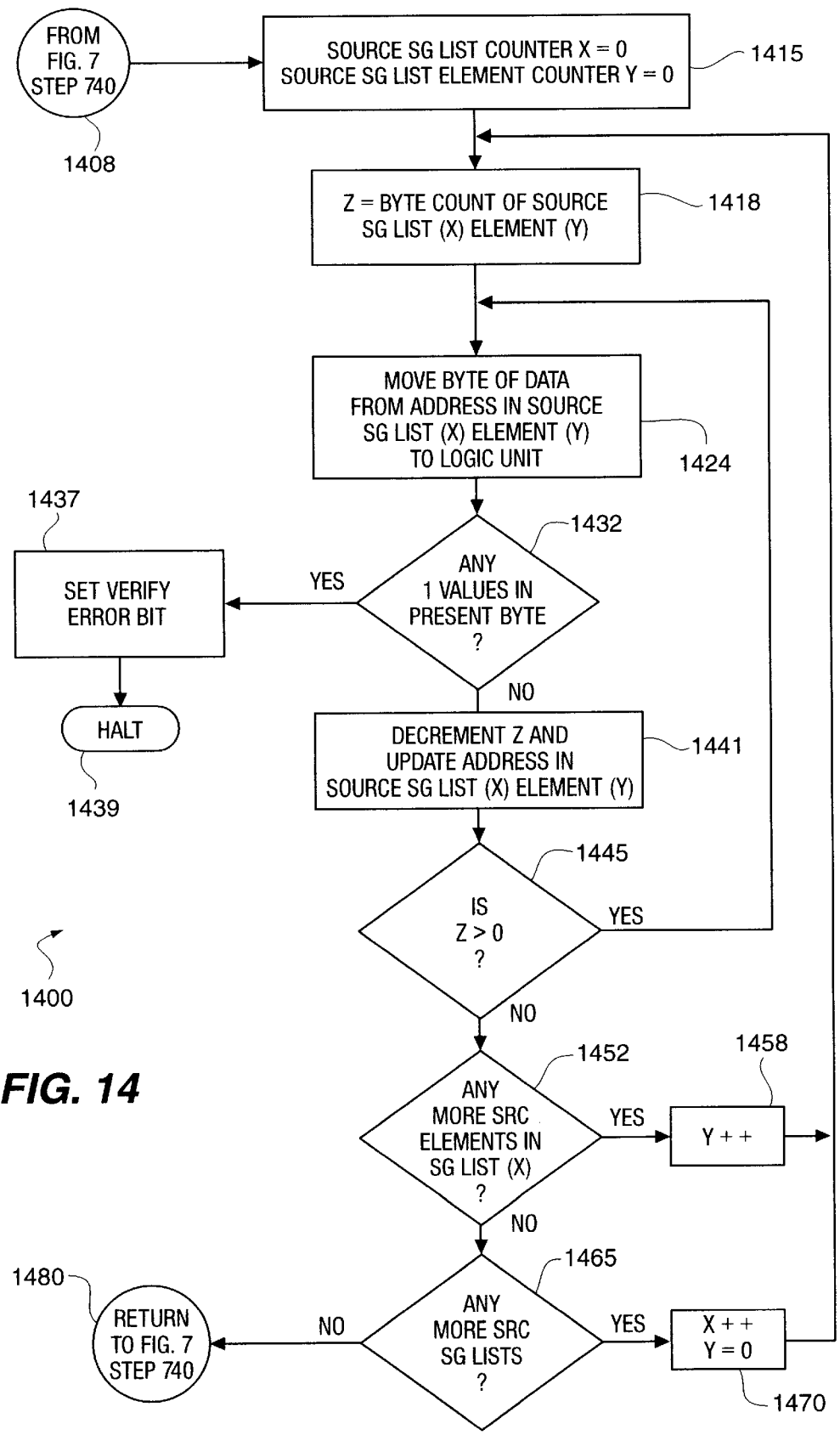
FIG. 14 illustrates the operational steps for executing a verify command and an ECC Check command.

FIG. 14 illustrates the operational steps 1400 for executing the Verify command. One purpose of the Verify command is to determine if the data pointed to by the source scatter/gather lists contains any 1 values, and if 1 values exist to note the presence of 1 values by setting a Verify Error bit in the Interrupt Source register 271. The Verify command functions in a manner such that the combination of the XOR command and the Verify command achieve the same end as would executing the Compare command alone as previously disclosed in the text accompanying FIG. 13. However, the existence of the set of commands that include an XOR, Verify, and Compare, afford significant I/O operation flexibility for the CI 155.

The operational steps 1400 begin at step 1408 and are the details of step 740 in FIG. 7. At step 1415, the counter x is initialized to 0 to represent the present source scatter/gather list on which the present command is operating, and the counter y is initialized to 0 to represent the present source element in source scatter/gather list (x) being operated on by the present command. Further, at step 1418, the counter z is initialized to the byte count 612 representing the number of bytes at the location pointed to by source scatter/gather list (x) element (y).

At step 1424, at least one byte of data is moved from the address in the source scatter/gather list (x) element (y) to the Logic Unit 263. If it is determined at decision step 1432 that the byte or bytes in the Logic Unit 263 contain a 1 value, then at step 1437 the Verify Error bit is set in the Error Status register 273 and the Cl 155 halts at step 1439. An address of the data location at or near the source of the location of the Verify error can also be stored in the Error Address register 275 by the Cl 155. The Cl 155 remains halted at step 1439 until the Recovery bit is set in the Recover register 274. Alternatively, if it is determined at decision step 1432 that there are no 1 values in the byte or bytes in the Logic Unit 263, then processing continues at step 1441. At step 1441, the counter z representing the byte count of the source scatter/gather list (x) element (y) is decremented by the number of bytes moved in step 1424 and the address in the source scatter/gather list (x) element (y) is updated to reflect the number of bytes moved in step 1424.

If it is determined at decision step 1445 that the byte counter z is greater than zero, then processing continues to evaluate source data at step 1424 as previously disclosed. Alternatively, if it is determined at decision step 1445 that the byte counter z is less than or equal to zero, then processing continues at step 1452. If it is determined at decision step 1452 that there are more source elements to process in the source scatter/gather list (x) in view of the total number of available source elements in Source SG Count (x) 541–542, then the source element counter y is incremented and processing continues to evaluate source data at step 1418 as previously disclosed. Alternatively if it is determined at decision step 1452 that there are no more source elements in the source scatter/gather list (x), then processing continues at step 1465.

If it is determined at decision step 1465 that there are more source scatter/gather lists among the total number of source scatter/gather lists in Source Count 540, then at step 1470 the source scatter/gather list counter (x) is incremented and the source element counter (y) is reinitialized to point to the first element in the next source scatter/gather list. Processing then continues to evaluate source data at step 1418 as previously disclosed. Alternatively, if it is determined at decision step 1465 that there are no more source scatter/gather lists among the total number of source scatter/gather lists in Source Count 540, then processing continues at step 1480 by returning to step 740 in FIG. 7.

The ECC Check command is substantially similar to the operational steps 1400 in all respects except for the specific details of steps 1432 and 1437 as a disclosed below. One purpose of the ECC Check command is to determine the existence of errors and/or correct any errors where possible. Specifically when executing the ECC Check command, the decision step 1432 determines whether or not an uncorrectable ECC error exists in the byte or bytes presently loaded in the Logic Unit 263. If an ECC error exists, then the ECC Error bit is set in the Error Status register 273 and the Cl 155 halts at step 1439 in the same manner as previously disclosed in the text accompanying step 1439 in FIG. 14. Alternatively, if when executing the ECC Check command it is determined at decision step 1432 that the present byte or bytes do not contain ECC errors, then processing continues at step 1441 as previously disclosed in the text accompanying FIG. 14.

SUMMARY

The present invention is a hardware accelerated I/O data processing engine to execute a minimum number of types of I/O data processing commands in response to a stimulus from a host computer. The hardware accelerated I/O data processing engine includes a command queue, a logic unit, a multiple purpose interface, at least one memory, and a controlling state machine. Although specific embodiments are disclosed herein, it is expected that persons skilled in the art can and will design alternative command interpreter systems that are within the scope of the following claims either literally or through the Doctrine of Equivalents.

What is claimed is:

1. A method for using a command interpreter in an I/O controller, said command interpreter having a command queue, a logic unit, at least one local memory, and a controlling state machine, said method comprising:

defining a plurality of programmable I/O data processing commands selected from a group of commands comprised of: Initialize, Copy, DMA Read, DMA Write, Cumulative Exclusive OR, Verify, Compare, and ECC Check;

distinguishing each of said plurality of programmable I/O data processing commands in a command block with a unique code;

executing any one of said plurality of programmable I/O data processing commands by said command interpreter in response to a stimulus from a local host processor and in a manner based on a principal of a plurality of read operations for each write operation.

2. A method according to claim 1 including:

operating said command interpreter as a self-contained plurality of gated logic blocks and registers independent of said local host processor and absent any controlling software.

3. A method according to claim 1 including:

defining a local I/O controller cache for use by said command interpreter as a source data cache and a destination data cache; and implementing a data FIFO cache for use by said command interpreter as an internal command interpreter work space.

4. A method according to claim 1 wherein said stimulus of said executing step includes:

constructing said command block and at least one scatter/gather list, said command block comprising a command code, at least one scatter/gather list address, and at least one scatter/gather list element count corresponding to each of said at least one scatter/gather list; and inserting an address of said command block on said command queue by said local host processor.

5. A method according to claim 1 wherein said step of executing includes:

retrieving a command block address from said command queue;

first step of moving said command block from a source location identified by said command block address and to a destination location within said command interpreter;

identifying a command type specified in said command block;

second step of moving data, where dictated by said command type, from a source location external to said command interpreter to one of said at least one memory that is local to said command interpreter, said at least one memory being a random access memory cache; and performing a task in a manner dictated by said command type on data at a location selected from at least one of a group of locations comprised of: a source data location and a destination data location.

6. A method according to claim 5 wherein said first step of moving includes:

determining a location of said command block and at least one scatter/gather list identified in said command block selected from at least one of a group of locations comprised of: a local I/O controller memory and a non-local I/O controller memory; and retrieving said at least one scatter/gather list from one of said group of locations to a destination location within said command interpreter, said at least one scatter/ gather list being comprised of at least one pointer to a data location and at least one corresponding byte count indicative of a number of bytes at said data location.

7. A method according to claim 1 wherein said step of executing includes:

identifying a command type specified in said command block;

first step of executing a plurality of reads to move data from a source location to said at least one local memory within said command interpreter, said at least one local memory being a data FIFO cache;

manipulating said data in said data FIFO in a manner dictated by said command type; and second step of executing a single write to move a contents of said data FIFO cache to a destination location.

8. A method according to claim 1 wherein said step of executing includes:

identifying a successful command completion;

identifying an unsuccessful command completion;

generating an interrupt for said local host processor indicative of said successful command completion and said unsuccessful command completion;

halting said command interpreter on occurrence of said unsuccessful command completion; and restarting a halted command interpreter only in response to a restart stimulus from said local host processor.

9. An improved performance command interpreter system for use in an I/O controller of a local host processor, said system comprising:

a hardware accelerated I/O data processing engine having a command queue, a logic unit, at least one local memory, and a controlling state machine;

a plurality of programmable I/O data processing commands; and means for executing any one of said plurality of programmable I/O data processing commands by said data processing engine in response to a stimulus from said local host processor and in a manner based on a principal of a plurality of read operations for each write operation.

10. A system according to claim 9 wherein said hardware accelerated I/O data processing engine includes:

means for operating said data processing engine as a self-contained plurality of gated logic blocks and registers independent of said local host processor and absent any controlling software.

11. A system according to claim 9 wherein said at least one local memory includes:

a local I/O controller cache for use by said data processing engine as a source data cache and a destination data cache; and a data FIFO cache for use by said data processing engine as an internal data processing engine work space.

12. A system according to claim 9 wherein said plurality of programmable I/O data processing commands include:

at least one command selected from at least one of a group of commands comprised of: Initialize, Copy, DMA Read, DMA Write, Cumulative Exclusive OR, Verify, Compare, and ECC Check; and a unique code identifying each of said at least one command.

13. A system according to claim 1 wherein said stimulus of said means for executing includes:

means for constructing a command block and at least one scatter/gather list, said command block comprising a command code, at least one scatter/gather list address, and at least one scatter/gather list element count corresponding to each of said at least one scatter/gather list; and means for inserting an address of said command block on said command queue by said local host processor.

14. A system according to claim 9 wherein said means for executing includes:

means for retrieving a command block address from said command queue;

first means for moving a command block from a source location identified by said command block address and to a destination location within said data processing engine;

means for identifying a command type specified in said command block;

second means for moving data, where dictated by said command type, from a source location external to said data processing engine to one of said at least one memory that is local to said data processing engine, said at least one memory being a random access memory cache; and means for performing a task in a manner dictated by said command type on data at a location selected from at least one of a group of locations comprised of: a source data location and a destination data location.

15. A system according to claim 14 wherein said first means for moving includes:

means for determining a location of said command block and at least one scatter/gather list identified in said command block selected from at least one of a group of locations comprised of: a local I/O controller memory and a non-local I/O controller memory; and means for retrieving said at least one scatter/gather list from one of said group of locations to a destination location within said data processing engine, said at least one scatter/gather list being comprised of at least one pointer to a data location and at least one corresponding byte count indicative of a number of bytes at said data location.

16. A system according to claim 9 wherein said means for executing includes:

means for identifying a command type specified in said command block;

first means for executing multiple read operations to move data from a source location to said at least one local memory within said data processing engine, said at least one local memory being a data FIFO cache;

means for manipulating said data in said data FIFO in a manner dictated by said command type; and second means for executing a single write operation to move a contents of said data FIFO cache to a destination location.

17. A method in a hardware implemented command interpreter system having a command interpreter and a cache memory for an I/O controller in a local host computer, said method comprising:

receiving a request for an I/O data operation, said request having a command code, at least one data location pointer selected from at least one of a group of location types comprised of: a source data location and a destination data location, and a byte count indicative of a number of bytes in a respective data location, and at least one element count indicative of a number of data locations pointed to by a scatter/gather list; and executing said I/O data operation in a manner dictated by said I/O data operation and in a manner dictated by multiple reads for each write where said request requires a source data location and a destination data location.

18. A method according to claim 17 wherein said step of receiving includes:

storing an address of said request in a register local to said command interpreter; and queuing said request as needed prior to when a presently executing request is complete.

19. A method according to claim 17 wherein said step of executing includes:

retrieving a command block and at least one scatter/gather list from a memory location identified in said request;

identifying a type of said I/O data operation identified in said command block, said type of I/O data operation selected from at least one of a group of types comprised of: Initialize, Copy, DMA Read, DMA Write, Cumulative Exclusive OR, Verify, Compare, and ECC Check;

loading at least one list of data location pointers from at least one memory location identified in said command block on which said I/O data operation can operate; and performing said I/O data operation on data identified by one of said at least one data location pointers.

* * * * *